3,409,681
METHOD OF MAKING NOVEL BIMETALLIC HETEROGENEOUS CATALYSTS AND THEIR USE IN HYDROCARBON CONVERSIONS
Wolfram R. Kroll, Linden, N.J., assignor to Esso Research and Engineering Company, a corporation of Delaware
No Drawing. Filed May 21, 1965, Ser. No. 457,848
25 Claims. (Cl. 260—666)

This invention relates to a novel catalyst system which has utility in a number of environments such as hydrogenation, dehydrogenation, isomerization, hydrogen transfer, etc. More particularly, this invention relates to a solid complex system of Ziegler type catalysts, and derivatives of such a system, all of which exhibit exceptionally high activity in the above-mentioned environments.

In co-pending, commonly assigned U.S. patent applications S.N. 281,347, filed May 17, 1963, now Patent No. 3,323,902, and S.N. 378,034, filed June 25, 1964, now abandoned, homogeneous catalyst systems comprising a complex mixture of a transition metal compound and certain organometallic compounds are disclosed. Such catalyst systems were found to be highly active in a variety of hydrogenation, dehydrogenation, isomerization, etc. processes. However, all of the catalysts disclosed in these earlier applications were soluble systems which were employed in a homogeneous reaction environment. While such systems may be desirable for some applications, they none the less necessitate the utilization of techniques for separating the catalyst from its environment at the conclusion of the desired reaction. These separation techniques serve to increase the cost of carrying out the desired reactions.

It is an object of this invention to provide a novel solid catalyst system which is employable in heterogeneous liquid and gas phase reaction systems.

It is a further object of this invention to provide a complex solid catalyst system which is highly active for the hydrogenation of aromatic and aliphatic compounds under mild conditions of temperature and pressure.

Yet another object of this invention is to provide a complex catalyst system for a wide variety of processes including selective hydrogenation, dehydrogenation, isomerization and hydrogen transfer.

These and other objects are accomplished by the reduction of a transition metal compound or mixtures of such compounds with specific organo-metallic compounds under controlled conditions which result in the formation of solid, high surface area, solids having catalytic properties. The systems produced in this manner may be utilized for rapid hydrogenation of olefinic, aromatic and heterocyclic materials under relatively mild conditions of temperature and pressure. Furthermore, by properly selecting the components of the complex catalytic system it is possible to obtain systems which may be employed for selective hydrogenation. In addition, the solid catalyst system may be employed alone, or admixed with support materials to provide solid catalysts which are employable in liquid and gas phase isomerization and hydrogen transfer reactions in addition to the hydrogenation reactions mentioned above.

The metal compounds reduced to form the solid catalyst system of this invention are transition metal compounds. Metal selected from each of Groups I-B to VIII-B of the Periodic Table may be successfully reduced and utilized in this invention. For example, copper, zinc, titanium, vanadium, molybdenum, chromium and platinum salts may all be employed to form active catalyst systems. Particularly preferred metals compounds are those of the noble metals and Group VIII-B metals such as iron, cobalt, nickel and platinum. The compounds described above may be employed alone or in combination with each other to produce mixed catalyst systems, e.g., iron-cobalt, copper-iron and copper-cobalt.

The anionic component of the transition metal compound may be selected from both organic and inorganic sources. Examples of inorganic radicals which may be employed are chlorides, bromides, $SiF_6$. Organic radicals are preferred components of the transition metal compounds and include such materials as acetates and naphthenates or other organic materials which exhibit excellent solubility and drying characteristics. A particularly preferred organic component is a chelate, e.g., the acetylacetonate, due to its excellent solubility and ready availability. Of course, other chelates can be employed such as dimethylglyoxime derivatives.

The selection of the organo-metallic reducing agent which forms a part of the complex catalyst system of this invention is a critical feature if a solid, insoluble catalyst system is to be obtained. The organo-metallic compounds most suitable for use in this invention are trimethylaluminum and dimethylmagnesium, the former being preferred. In addition, compounds having the formula $Al(CH_3)_2Y$ wherein Y is a halogen, hydrogen a psuedo halogen (such as a CN group), lower alkoxides (such as methoxide and ethoxide) or azide may also be employed as the organo-metallic component of the catalyst system.

The complex insoluble catalyst systems of this invention are prepared by admixing the transition metal compound and orgango-metallic compuond, as described above, in a solvent and recovering the complex catalyst as a solid precipitate from the solution. In a less preferred embodiment, it is possible to prepare the solid catalyst by passing the organo-metallic material in the form of a vapor over the transition metal compound. While not wishing to be limited to any particular theory, it is believed that the organoaluminum compound reduces the transition metal component to a lower valence state which complexes with the reduced transition metal to form the insoluble precipitate. The conditions of preparation of the catalyst system are not critical and in most cases ambient conditions of temperature and pressure are sufficient. However, reductions may be carried out at temperatures in the range of $-10°$ to $+100°$ C. Under certain circumstances the reduction may be accelerated without deleterious affect by employing temperatures in the upper portion of the above range. The solvent employed in the catalyst system may be a liquid hydrocarbon or less preferably a polar compound such as a Lewis base or a weak Lewis acid such as tertiary butyl alcohol or a hydrocarbon containing oxygen or nitrogen. Preferred hydrocarbon solvents are $C_5$ to $C_{20}$ aliphatics, such as pentane and heptance and $C_6$ to $C_{23}$ aromatics such as benzene. Preferred polar compounds are ethers such as diethyl ether, p-dioxane, dimethoxyethane, diglyme and tertiary amines such as triethylamine and normal methylmorpholine.

The ratio of transition metal compound to organo-aluminum compound in the above-described catalyst preparation may be varied over a reasonably broad range. Suitable ratios are within the range of 1/1 to 30/1, preferably 2/1 to 10/1 moles of aluminum per mole of transition metal in the reaction system. The lower portion of the above-described range is particularly preferred since the utilization of excess amounts of organo-aluminum compound may loosely combine with the solid catalyst system and thereby decrease the catalytic activity of the system unless the solid is further treated, e.g. by washing, to remove the excess organo-metallic material.

In a typical preparation of the catalyst of this invention the transition metal compound and organo-aluminum component in the proper proportions as defined above are brought together with 50 to 300 milliliters, preferably 100 to 200 milliliters of a suitable solvent and the mixture is dispersed e.g. by agitation or ultrasonic dispersion, while maintaining the proper conditions, e.g. ambient conditions, for a period of about 5 to 60 minutes, preferably 10 to 30 minutes. At the conclusion of the reaction, the reaction mixture consists of a solid precipitate and the overstanding solution. The solid precipitate, which is the novel catalyst system of this invention, may be recovered from solution by simple decantation or by other means of physical separation such as filtration or centrifugation. It should be noted that certain species of the novel catalyst system of this invention, particularly the systems derived from cobalt and iron salts have magnetic properties which may be employed to advantage in the preparation, e.g. magnetic stirring, as well as in the subsequent separation and transportation of the novel complex catalyst system.

The complex catalyst system recovered from solution as described above is an extremely high surface area material which may be employed, without further workup, in a wide variety of reactions. However, these catalyst systems have a very high surface area and a very small particle size and therefore may tend to agglomerate under certain conditions of use. In addition, many of these catalytic materials are pyrophoric in nature. It is therefore a further feature of this invention to prepare the complex catalyst system derived from the above-described reduction process in a diluted form. It has been surprisingly discovered that the dilution of the solid complex system with an additional non-pyrophoric solid not only reduces the handling hazards but also increases catalyst life by preventing agglomeration. Indeed, it has been found that dilution of the catalyst system serves to effectively increase the activity of the catalyst. The dilution of the complex catalyst system of this invention is simply accomplished by mechanically mixing, e.g., ballmilling, the catalyst with a porous support while maintaining an inert atmosphere, e.g., argon, methane, hydrogen and nitrogen. Typical support materials which may be mechanically mixed with the solid catalyst of this invention are alumina, silica-alumina, activated carbon, titanium dioxides, zirconium dioxides, magnesia, clay and synthetic and natural molecular sieves such as faujasites and mordenites.

The catalyst system, in either diluted or undiluted form, may be utilized as a highly active species of hydrogenation catalyst. It has been discovered that these systems have superior activity when compared with commercially employed Raney metal catalysts and exhibit activity at unusually lower reaction conditions, e.g. temperature and pressure, than those commonly employed in catalytic hydrogenation processes. A wide variety of unsaturated compounds may be reduced with this catalyst system. Thus, the catalyst system of this invention may be successfully employed to reduce compounds containing carbon-carbon unsaturation, carbon-nitrogen unsaturation and carbon-oxygen unsaturation. The carbon-carbon unsaturated feeds may be unsubstituted or may be substituted with additional functional groups and include olefinic compounds such as $C_2$ to $C_{30}$ acyclic and cyclic mono-, di- and triolefins, $C_2$ to $C_{30}$ acetylenic compounds and $C_6$ to $C_{30}$ aromatic and substituted, e.g. alkyl, aromatic compounds. Typical examples of carbon-carbon unsaturated compounds which may be hydrogenated in accordance with this invention are butene, octene, cyclohexene, cyclododecatriene, norbornylene, acetylene, octyne-4, hexyne-3, phenylacetylene, benzene, toluene, xylene, naphthalene and anthracene. The carbon-nitrogen unsaturated compounds include nitriles, imines and heterocyclic nitrogen containing compounds having from 5 to 50 carbon atoms. Typical examples of these nitrogen containing compounds are benzonitrile, benzylamine and quinoline. Carbon-oxygen unsaturated compounds may also be employed as feeds in a hydrogenation process of this invention and includes such materials such as aldehydes, ketones and esters.

The hydrogenation conditions may vary over wide limits depending upon the particular feedstock employed. Furthermore, hydrogenation employing the complex catalyst system of this invention may be performed in either the liquid or gas phase. Thus, the hydrogenation of olefinically unsaturated materials will take place rapidly at temperatures in the range of $-50°$ to $500°$ C., preferably $-10°$ to $+50°$ C. and pressures in the range of atmospheric pressure to 1,000 p.s.i.g. of hydrogen, preferably 0 to 150 p.s.i.g. Hydrogenation of aromatic feedstocks may be rapidly carried out at room temperature ($20°$ C.) and low pressures in the range of 10 to 150 p.s.i.g. It will be understood that a broader range of reaction conditions such as those described above for olefinic reactants may be employed when hydrogenating aromatic feedstocks but that the utilization of more severe conditions is not critical to the successful completion of the reaction in most instances. It will be further understood, that when working with more difficulty reducible feedstocks, such as nitriles, the reaction rate will be enhanced by higher temperatures and pressures within the above state ranges.

The length of the hydrogenation reaction is not critical and reaction time may range from 2 minutes to 3 or 4 hours. Similarly, the concentration of catalyst may vary over wide limits with only small amounts being sufficient to effect substantial conversions of the feedstock. Ordinarily, 0.001 to 1%, preferably 0.01 to 0.1% of the transition metal based on feed to the reaction, may be employed.

In another embodiment of the present invention, it has been discovered that the catalyst systems of this invention may be employed in liquid and gas phase isomerization reactions utilizing feedstocks which are well known in the art. The catalyst system of this invention, however, due to its high activity, requires the utilization of less severe reaction conditions and therefore makes selective isomerizations possible. Typical isomerizations which may be performed are the conversion of terminally bonded olefinic feedstocks to internally bonded feedstocks and the conversion of non-conjugated diolefins to conjugated diolefins. The isomerizations technique may be applied to $C_2$ to $C_{30}$ straight and branched chain olefins having at least one double bond. Typical reaction conditions are in the range described above with respect to hydrogenation reactions and are, of course, dependent on the feedstock selected. In some instances it may be advantageous to employ a limited hydrogen atmosphere in the isomerization reaction.

The catalyst system of this invention may also be employed in hydrogen redistribution or transfer reactions. For example, cyclohexene may be refluxed over the catalyst system of this invention, in the absence of hydrogen, to yield benzene and cyclohexane. It will occur to those skilled in the art that this technique may be applied to any cyclic olefin to yield the more saturated and less saturated derivatives. The hydrogen transfer reaction is usually carried out in liquid phase at elevated temperatures usually near the boiling point of the particular feedstock being employed. It will be understood by those skilled in the art that the hydrogen transfer reaction described herein may be employed to effect a wide variety of selective hydrogen reactions, in the absence of hydrogen, by utilizing cyclohexene or some other hydrogen donor source as a mild hydrogenation agent.

By careful control of the reaction conditions, the catalyst system of this invention is capable of effecting selective hydrogenation reactions such as the removal of acetylenes from olefinic streams or the hydrogenation of terminally bonded olefinic materials in the presence of internally bonded structures. Furthermore, the high surface area and activity of the catalyst system of this invention make it suitable for a wide variety of other catalytic reactions where such features are essential such as cracking, hydrocracking, reforming, powerforming and town gas manufacture.

The invention will be further understood by reference to the following illustrative examples.

EXAMPLE 1

5.0 grams of cobalt-II-acetylacetonate in 200 ml. of heptane was reacted with 4.2 grams of trimethylaluminum in 50 ml. of heptane at ambient conditions (atmospheric pressure; approximately 20° C.) under agitation. A solid black reaction product precipitated from the solution and was allowed to settle. The clear, nearly colorless, overstanding liquid was decanted and the solid was dried. An analysis of the solid material, i.e. the reduced cobalt catalyst, showed an argon surface area of 150 square meters/gram. Commercial conventional catalyst with similar metal content normally possess a surface area of less than 30 square meters/gram.

EXAMPLE 2

431 mg. of the catalyst described in Example 1 were added to a mixture of 100 millimoles of cyclohexene, 5 grams of heptane and enough benzene to make 100 ml. The total mixture was hydrogenated at a hydrogen pressure of 25 p.s.i.g. and a temperature of 22° C. In less than 7.5 minutes all cyclohexene was hydrogenated to form cyclohexane. The results indicate the exceptional activity of the catalyst system of this invention.

EXAMPLE 3

440 mg. of the catalyst of Example 1 were added to a mixture of 100 millimoles of benzene and enough heptane to make 100 ml. The total mixture was hydrogenated under a hydrogen pressure of 150 p.s.i.g. and a temperature of 20° C. In less than 77 minutes all benzene had been hydrogenated to form cyclohexane.

EXAMPLE 4

In a manner similar to that described in Example 1, solid insoluble catalysts were prepared from the acetylacetonates of cobalt, iron, nickel, and molybdenum, as well as from platinic chloride. In each instance the reaction mixture was agitated and then permitted to stand for less than 1 hour whereupon the overstanding solution was removed from the solid catalytic materials by decantation or centrifugation. The individual solids recovered were analyzed to determine the content of transition metal and aluminum present in each instance. The results tabulated below would appear to indicate that the aluminum to transition metal ratios approximate whole integers and that therefore novel compositions have been formed.

TABLE I

| Transition metal | Percent transition metal | Percent aluminum | Ratio tr. metal: aluminum |
|---|---|---|---|
| Cobalt | 42.1 | 10.3 | ~2:1 |
| Iron | 69.7 | 4.2 | ~8:1 |
| Nickel | 27.7 | 13.4 | ~9:1 |
| Platinum | 55.8 | 6.6 | ~1:1 |
| Molybdenum | 25.9 | 15.1 | ~5:1 |

EXAMPLE 5

In the manner described in Example 1, a solid catalyst was formed by mixing 7 grams of nickel acetylacetonate dissolved in 200 millimeters of heptane and 5.2 grams of trimethylaluminum dissolved in 50 millimeters of heptane. The solid formed as a result of the above reaction was separated by centrifugation and subsequently dried in vacuo. 453 mg. of this solid was employed to hydrogenate benzene (100 millimoles) in pentane as a solvent. Reaction conditions were 150 p.s.i.g. of $H_2$ and 20° C. Approximately 50% of the benzene was converted to cyclohexane in 10 hours.

EXAMPLE 6

7 grams of ferricacetylacetonate in 200 millimeters of pentane were mixed (with agitation) with 6.4 grams of trimethylaluminum in 50 millimeters of pentane at room temperature. After the reaction, the solid readily settled out and was separated from the overstanding solution by decantation. After drying the solid (in vacuo), 493 milligrams was employed to hydrogenate benzene (100 millimoles) in pentane as a solvent. Reaction conditions were 150 p.s.i.g. of $H_2$ and 20° C. Approximately 50% of the benzene was hydrogenated to cyclohexane in 58 minutes.

EXAMPLE 7

476 mg. of a solid cobalt catalyst prepared in the manner described in Example 1 was placed under nitrogen in a glass liner together with 10.7 grams of paraxylene. The volume of the reaction mixture was brought to 100 millimeters by dilution with dry normal pentane. After stirring the catalyst settled out immediately while the overstanding liquid was clear and only slightly yellow colored. The glass liner, maintained under nitrogen atmosphere, was transferred to an autoclave, heated to 50° C. and pressurized with 100 p.s.i.g. of hydrogen. The reaction was carried out under continuous stirring which was accomplished by utilizing a magnetic stirrer since the solid catalyst was attracted. After 86 minutes all paraxylene had been hydrogenated to a cis, mixture of 1,4-dimethylcyclohexane, the isomers having a molar ratio of 1.5 to 1.

EXAMPLE 8

In an experiment similar to Example 7, 479.5 mg. of a reduced platinum catalyst prepared by the reduction of platinic chloride with trimethylaluminum in a manner similar to that described in Example 1, were used to hydrogenate 10.65 grams of paraxylene in the manner described in Example 7. After 92 minutes all paraxylene had been hydrogenated to a cis, trans, mixture of 1,4-dimethylcyclohexane.

EXAMPLE 9

A mixture of 2.8 grams of cobalt acetylacetonate and 3.5 grams ferricacetylacetonate were slurried with heptane and mixed with a solution of 5.1 grams of trimethylaluminum in 50 millimeters of heptane. Subsequently, the coreduced iron-cobalt was isolated and dried in vacuo. This catalyst contained iron and cobalt in approximately 1:1 molar ratio. 453 milligrams of this catalyst were used to hydrogenate benzene at 20° C. and 150 p.s.i.g. After 78 minutes, all benzene had been hydrogenated. Comparison of the rate data of this hydrogenation with other hydrogenations where iron or cobalt catalyst had been employed alone (see earlier examples) indicate that the coreduced catalyst has a substantially (27%) higher hydrogenation activity.

EXAMPLE 10

A reduced solid cobalt catalyst was prepared by the reaction of cobalt-acetylacetonate in pentane with trimethylaluminum using a molar ratio of aluminum to cobalt of 3:1. Upon completion of the reaction, a solid precipitate was isolated, recovered by decantation and dried in vacuo. The solid catalyst thus obtained contained 37.6% cobalt and 11.2% aluminum. 485 milligrams of this solid were employed to hydrogenate 100 millimoles of benzene at 20° C. and 150 p.s.i.g. hydrogen pressure. The benzene was completely hydrogenated to cyclohexane in 42 minutes.

.508 grams of the catalyst prepared above was ballmilled with 2.668 grams of anhydrous alumina for 30 minutes in a micro ballmill Grindo-mat. 3 grams of the ballmilled catalyst (containing 480 milligrams of the reduced cobalt catalyst) were employed in an identical hydrogenation experiment to that described above. In 32 minutes all of the benzene was hydrogenated to cyclohexane. The results clearly indicate the increased activity of the diluted catalyst system.

EXAMPLE 11

In an experiment similar to Example 10 a ballmilled cobalt-silica-alumina catalyst was prepared. 2.95 grams of this catalyst (containing 480 mg. of the cobalt catalyst), completely hydrogenated benzene in 34 minutes under the identical conditions employed in the previous example.

EXAMPLE 12

A ballmilled cobalt-alumina catalyst prepared in a manner described in Example 10 was employed for the hydrogenation of paraxylene at 50° C. and 150 p.s.i.g. constant hydrogen pressure. The paraxylene was completely hydrogenated in 60 minutes. The results once again indicate the increased activity of the solid diluted catalyst.

EXAMPLE 13

3 moles of cyclohexene and 1 mole of benzene in two moles of cyclohexane were refluxed in the presence of 404.5 milligrams of the solid reduced cobalt catalyst of Example 1. After 21 hours, it was found that a 39% conversion of cyclohexene (to benzene and cyclohexane) had been effected. The results of this example indicate the utility of the novel catalytic system in hydrogen transfer reactions.

EXAMPLE 14

The effectiveness of the catalyst system of this invention in gas phase reactions was investigated by placing 1 millimeter of the reduced cobalt catalyst of Example 1 in a microreactor. A feed containing 5% hydrogen and 95% butene-1 was passed over the catalyst at a temperature of 200° C., atmospheric pressure and a flow rate of 18 volumes of feed/volume of catalyst/hour. A 55% conversion of butene-1 to butene-2 was obseved. The results indicate the utility of the catalyst of this invention in isomerization reactions as well as in gas phase reactions. The addition of larger amounts of hydrogen to the feed mixture would result in substantial hydrogenation of the feed under the same conditions of reaction.

Having thus described the general nature and specific embodiments of the invention the true scope will be pointed out by the appended claims.

What is claimed is:

1. A hydrogenation process which comprises reacting an unsaturated organic material with hydrogen at a temperature in the range of −50° to +500° C. and a pressure in the range of 0 to 1000 p.s.i.g. in the presence of a solid heterogeneous catalyst consisting essentially of a solid reaction product precipitated by a process consisting essentially of the reaction, in an inert solvent, of at least one transition metal compound soluble in said solvent, said transition metal being selected from the group consisting of iron, cobalt, nickel, and platinum with an organo aluminum compound having the formula $Al(CH_3)_2Y$ wherein Y is selected from the group consisting of halogen, hydrogen, methyl, methoxide, ethoxide, cyanide, and azide at a temperature in the range of −10° to +100° C., said transition metal and aluminum being in a molar ratio of 1:1 to 1:20.

2. The process of claim 1 wherein said hydrogenation temperature is in the range of −10° to +50° C. and the hydrogenation pressure is in the range of 0 to 150 p.s.i.g.

3. The process of claim 1 wherein said unsaturated organic material is a $C_2$ to $C_{30}$ hydrocarbon containing at least one double bond.

4. The process of claim 1 wherein said unsaturated organic material is a $C_6$ to $C_{30}$ aromatic compound.

5. The process of claim 1 wherein said solid catalyst is diluted with a porous support material selected from the group consisting of silica, alumina and silica-alumina.

6. The process of claim 1 wherein said hydrogenation is carried out in the gas phase.

7. The process of claim 1 wherein said hydrogenation is carried out in the liquid phase.

8. A hydrogenation process which comprises reacting an unsaturated organic material selected from the group consisting of $C_2$–$C_{30}$ hydrocarbons containing at least one double bond, $C_2$–$C_{30}$ acetylenic compounds, and $C_6$–$C_{30}$ aromatic compounds with hydrogen at a temperature in the range of −10° to +50° C. and a pressure in the range of 0 to 150 p.s.i.g. in the presence of a solid heterogeneous catalyst consisting essentially of a solid reaction product precipitated by a process consisting essentially of the reaction in an inert hydrocarbon solvent, of at least one transition metal chelate soluble in said solvent, said transition metal being selected from the group consisting of iron, cobalt, nickel, and platinum, with trimethyl aluminum at a temperatue in the range of −10° to +100° C., said transition metal and aluminum being in a molar ratio of 1:1 to 1:20.

9. The process of claim 8 wherein said unsaturated organic material is benzene.

10. The process of claim 8 wherein said solid catalyst is diluted with a porous support material selected from the group consisting of silica, alumina and silica-alumina.

11. In a process for preparing a catalyst which consists essentially of reducing, in an inert solvent, at least one transition metal compound soluble in said solvent, said transition metal being selected from the group consisting of iron, cobalt, nickel, and platinum by reacting the transition metal compound with an organo aluminum compound, said transition metal and aluminum being in a molar ratio of 1:1 to 1:20, at a temperature in the range of −10° to +100° C., the improvement which consists essentially of selecting an organo aluminum compound having the formula $Al(CH_3)_2Y$ wherein Y is selected from the group consisting of halogen, hydrogen, methyl, methoxide, ethoxide, cyanide, and azide, precipitating a solid catalyst from the reaction mixture and recovering the precipitated catalyst.

12. The process of claim 11 wherein the transition metal compound is a chelate and the organo aluminum compound is trimethyl aluminum.

13. The process of claim 12 wherein the organo aluminum compound is dimethyl aluminum hydride.

14. The process of claim 12 wherein the organo aluminum compound is dimethyl aluminum halide.

15. The process of claim 12 wherein the organo aluminum compound is dimethyl aluminum methoxide.

16. The process of claim 12 wherein the organo aluminum compound is dimethyl aluminum ethoxide.

17. The process of claim 12 wherein the organo aluminum compound is dimethyl aluminum cyanide.

18. The process of claim 12 wherein the organo aluminum compound is dimethyl aluminum azide.

19. In a process for preparing a catalyst which consists essentially of reducing, in an inert hydrocarbon solvent, at least one transition metal chelate soluble in said solvent, said transition metal being selected from the group consisting of iron, cobalt, nickel, and platinum by reacting said transition metal chelate with an organo aluminum compound, the transition metal and aluminum being in a molar ratio of 1:1 to 1:20, at a temperature of about −10° to +100° C., the improvement which consists essentially of selecting trimethyl aluminum as the organo aluminum compound, precipitating a solid catalyst from the reaction mixture, and recovering the precipitated catalyst.

20. A hydrogenation process which comprises reacting an unsaturated organic material with hydrogen at a temperature in the range of −50° to +500° C. and a pressure in the range of 0 to 1000 p.s.i.g. in the presence of a solid heterogeneous catalyst consisting essentially of a solid reaction product precipitated by reducing, in an inert solvent, at least one transition metal compound soluble in said solvent, said transition metal being selected from the group consisting of iron, cobalt, nickel, and platinum, with an organo aluminum compound having the formula $Al(CH_3)_2Y$ wherein Y is selected from the group consisting of hydrogen, halogen, methyl, methoxide, ethoxide, cyanide, and azide at a temperature in the range of −10° to +100° C., said transition metal and aluminum being in a molar ratio of 1:1 to 1:20.

21. A hydrogenation process which comprises reacting an unsaturated organic material selected from the group consisting of $C_2$–$C_{30}$ hydrocarbons containing at least one double bond, $C_2$–$C_{30}$ acetylenic compounds, and $C_6$–$C_{30}$ aromatic compounds with hydrogen at a temperature in the range of −10° to +50° C. and a pressure in the range of 0 to 150 p.s.i.g. in the presence of a solid heterogeneous catalyst consisting essentially of a solid reaction product precipitated by reducing, in an inert hydrocarbon solvent, at least one transition metal chelate soluble in said solvent, said transition metal being selected from the group consisting of iron, cobalt, nickel, and platinum with trimethyl aluminum at a temperature in the range of −10° to +100° C., said transition metal and aluminum being in a molar ratio of 1:1 to 1:20.

22. A process consisting essentially of heating a $C_2$ to $C_{30}$ olefin containing a terminal double bond at a temperature of −50° to +500° C. in the presence of a solid catalyst precipitated by the reaction of at least one transition metal chelate selected from the group consisting of iron, cobalt, nickel and platinum with trimethylaluminum at a temperature in the range of −10° to +100° C. in the presence of an inert solvent, said transition metal and aluminum being in a molar ratio of 1:1 to 1:20 and recovering an olefin containing an internal double bond.

23. The process of claim 22 wherein the terminal olefin is butene-1 and the internal olefin recovered is butene-2.

24. A process consisting essentially of heating a cyclic olefin in the liquid phase in the region of the boiling point of said compound in the presence of a catalyst precipitated by the reaction of at least one transition metal chelate selected from the group consisting of iron, cobalt, nickel and platinum with trimethylaluminum at a temperature in the range of −10° to +100° C. in the presence of an inert solvent, said transition metal and aluminum being in a molar ratio of 1:1 to 1:20 and recovering a reaction product comprising hydrocarbons more highly unsaturated and less highly unsaturated than said cyclic olefin.

25. The process of claim 24 wherein said partially saturated aromatic compound is cyclohexene and said products are cyclohexane and benzene.

References Cited
UNITED STATES PATENTS

| | | | |
|---|---|---|---|
| 3,205,278 | 9/1965 | Lapporte | 260—667 |
| 3,247,270 | 4/1966 | Kirk | 252—428 |
| 3,281,375 | 10/1966 | Vandenberg | 252—429 |
| 3,113,986 | 12/1963 | Breslow et al. | 260—683.9 |

DELBERT E. GANTZ, *Primary Examiner.*